(12) United States Patent
Zhang et al.

(10) Patent No.: US 9,759,605 B2
(45) Date of Patent: Sep. 12, 2017

(54) LOW-ORBIT SATELLITE-BORNE IMAGE-SPECTRUM ASSOCIATED DETECTION METHOD AND PAYLOAD

(71) Applicant: HUAZHONG UNIVERSITY OF SCIENCE AND TECHNOLOGY, Wuhan, Hubei (CN)

(72) Inventors: Tianxu Zhang, Hubei (CN); Zhihui Yang, Hubei (CN); Jiayu Liu, Hubei (CN); Yutian Zhou, Hubei (CN); Shoukui Yao, Hubei (CN); Junqing Zhang, Hubei (CN)

(73) Assignee: Huazhong University of Science and Technology, Wuhan, Hubei (CN)

( * ) Notice: Subject to any disclaimer, the term of this patent is extended or adjusted under 35 U.S.C. 154(b) by 0 days.

(21) Appl. No.: 15/106,696

(22) PCT Filed: Feb. 10, 2015

(86) PCT No.: PCT/CN2015/072669
§ 371 (c)(1),
(2) Date: Jun. 20, 2016

(87) PCT Pub. No.: WO2016/106954
PCT Pub. Date: Jul. 7, 2016

(65) Prior Publication Data
US 2016/0356650 A1 Dec. 8, 2016

(30) Foreign Application Priority Data

Dec. 30, 2014 (CN) .......................... 2014 1 0851144

(51) Int. Cl.
*G01J 3/28* (2006.01)
*H01Q 15/14* (2006.01)
*G01J 3/02* (2006.01)

(52) U.S. Cl.
CPC ............... *G01J 3/28* (2013.01); *G01J 3/0208* (2013.01); *G01J 3/0289* (2013.01);
(Continued)

(58) Field of Classification Search
CPC .... G01J 5/0022; G01J 3/36; G01J 3/28; G01J 3/2823; G01J 3/0208; G01J 3/0289; H01Q 15/14
See application file for complete search history.

(56) References Cited

U.S. PATENT DOCUMENTS 8,330,087 B2 12/2012 Domenicali
9,006,659 B2* 4/2015 Zhang ................... G01J 5/0022
250/339.14

FOREIGN PATENT DOCUMENTS

CN 101303291 11/2008
CN 102564589 7/2012
(Continued)

*Primary Examiner* — David Porta
*Assistant Examiner* — Faye Boosalis
(74) *Attorney, Agent, or Firm* — Hamre, Schumann, Mueller & Larson, P.C.

(57) ABSTRACT

The present invention discloses a low-orbit satellite-borne image-spectrum associated detection method and payload. The method includes: (1) detecting and tracking moving targets and dynamic phenomena based on a pixel offset compensation method; and (2) performing multi-dimensional characteristic analysis on infrared spectra of the moving targets and the dynamic phenomena, to identify the moving targets and the dynamic phenomena. The payload includes a two-dimensional servo turntable, an infrared reflector, a multispectral infrared optical system, an infrared imaging unit, a broadband infrared spectrum measuring unit, a data processing unit and a control unit. The present invention can achieve coaxiality of an infrared imaging optical path and a short/medium/long wave infrared spectrum measuring optical path, detect infrared image informa-
(Continued)

tion and infrared spectra of moving targets and dynamic phenomena simultaneously and realize automatic detection, tracking, spectrum measurement and identification of multiple moving targets and dynamic phenomena in a scene, and has high identification efficiency and high tracking and positioning accuracy.

3 Claims, 5 Drawing Sheets

(52) U.S. Cl.
CPC ........... *G01J 3/0291* (2013.01); *G01J 3/2823* (2013.01); *H01Q 15/14* (2013.01)

(56) References Cited

FOREIGN PATENT DOCUMENTS

| | | |
|---|---|---|
| CN | 103776540 | 5/2014 |
| CN | 103777348 | 5/2014 |
| JP | 2009139352 | 6/2009 |

* cited by examiner

US 9,759,605 B2

LOW-ORBIT SATELLITE-BORNE IMAGE-SPECTRUM ASSOCIATED DETECTION METHOD AND PAYLOAD

TECHNICAL FIELD

The present invention relates to the field of satellite-borne remote sensing and detection technologies, and in particular, to a low-orbit satellite-borne image-spectrum associated detection method and payload.

BACKGROUND ART

A low-orbit satellite refers to an elliptical orbit satellite operating at an altitude of 500 km to 10,000 km above the earth, and a schematic diagram of an operating orbit of a low-orbit satellite is shown in FIG. 1. Different from a synchronous orbit satellite, the low-orbit satellite has a low orbit altitude and a high moving speed relative to the earth, for example, the moving speed of the US MSX satellite relative to the earth obtained by the stk software is in the range of 7 km/s to 7.59 km/s. Strong interference objects (for example, cirrus cloud, frozen lakes and thunder and lightning) near the edge and in the earth background may cause large inter-frame pixel offsets during imaging and form false targets, so there is in need of an algorithm for compensating for satellite movement, earth movement and object movement.

Every object radiates energy and has a unique spectrum curve, so a detected target can be identified by using the spectrum uniqueness. The existing low-orbit remote sensing payloads around the world do not have the capability of detecting both infrared image information and infrared spectra of moving targets and time-varying objects, for example, the US MSX satellite cannot perform real-time infrared spectral data collection and remote sensing and detection on moving targets and dynamic phenomena that dynamically change in different background regions.

SUMMARY

Directed to the above defects or improving requirements of the prior art, the present invention provides a low-orbit satellite-borne image-spectrum associated detection method and payload, which can detect infrared image information and infrared spectra of moving targets and dynamic phenomena simultaneously and realize automatic detection, tracking, spectrum measurement and identification of multiple moving targets and dynamic phenomena in a scene, and have high identification efficiency and high tracking and positioning accuracy.

To achieve the above objective, the present invention provides a low-orbit satellite-borne image-spectrum associated detection method, which includes:

(1) detecting and tracking moving targets and dynamic phenomena, Step (1) further including:

(1-1) performing background clutter suppression on an infrared image;

(1-2) performing threshold segmentation on the image after the suppression, and extracting the suspected moving targets and dynamic phenomena;

(1-3) taking the suspected moving targets and dynamic phenomena as processing objects, performing Steps (A1) to (A4) to detect the real moving targets and dynamic phenomena, and placing the center of field of view (FOV) at predicted positions of the moving targets or the dynamic phenomena so as to track the moving targets or the dynamic phenomena;

(1-4) measuring infrared broadband spectra of regions surrounding the center of FOV to obtain regional spectra corresponding to the moving targets or the dynamic phenomena; and (1-5) taking the moving targets or the dynamic phenomena tracked in Step (1-3) as processing objects, and repeating Steps (A1) to (A4) to track the moving targets or the dynamic phenomena, in which Steps (A1) to (A4) are respectively as follows:

(A1) performing pixel offset compensation of coordinate transformation on processing objects of multiple frames of images;

(A2) performing correlation of the multiple frames of images after pixel offset compensation to detect the real processing objects;

(A3) when the processing objects are moving targets, calculating image plane speed characteristics of the moving targets to obtain predicted positions thereof; and when the processing objects are dynamic phenomena, calculating gray characteristics of the dynamic phenomena to obtain predicted positions thereof; and (A4) positioning positions of next-frame processing objects to the predicted positions of the processing objects, and placing the center of FOV at the predicted positions of the processing objects;

(2) performing multi-dimensional characteristic analysis on infrared spectra of the moving targets and the dynamic phenomena, to identify the moving targets and the dynamic phenomena, Step (2) further including:

(2-1) positioning the moving targets and the dynamic phenomena and measuring infrared spectra of the moving targets and the dynamic phenomena;

(2-2) performing compensation and correction on the infrared spectra of the moving targets and the dynamic phenomena;

(2-3) removing the regional spectra corresponding to the moving targets and the dynamic phenomena from the infrared spectra of the moving targets and the dynamic phenomena after correction, so as to extract infrared spectrum fingerprints of the moving targets and the dynamic phenomena; and (2-4) matching the infrared spectrum fingerprints of the moving targets and the dynamic phenomena with a typical infrared spectrum library to identify the moving targets and the dynamic phenomena.

Preferably, in Step (A1), pixel offset compensation of coordinate transformation is performed on processing objects of two adjacent frames of images in the following method:

(B1) determining a transformation relationship matrix $M_1$ from an earth core fixed connection coordinate system to a satellite coordinate system according to positions of an explorer satellite and the sun; determining a transformation relationship matrix $M_2$ from the satellite coordinate system to an image coordinate system according to the pinhole imaging principle; and determining a transformation relationship matrix $M_3$ between satellite coordinate systems at different moments according to positions of the explorer satellite at the different moments, in which in the earth core fixed connection coordinate system, the earth core serves as the origin O, the X-axis points to the prime meridian, the Z-axis points to the North Pole, and the right-hand corkscrew rule is applied on the X-axis and Z-axis to obtain the Y-axis direction; in the satellite coordinate system, the direction $l_1$ where the explorer satellite points to the North Pole is the Z'-axis direction, the direction where the explorer satellite points to the sun is $l_2$, the vector direction of a cross-product of $l_1$ and $l_2$ is the Y'-axis direction, and the right-hand corkscrew rule is applied on the Y'-axis and Z'-axis to obtain the X'-axis direction; and the coordinates of a single pixel point in an image in the image coordinate system are formed by the row number and the column number of the position of the pixel point;

(B2) obtaining a pixel offset division curve by using the transformation relationship matrixes $M_1$, $M_2$, and $M_3$ according to the positions of the satellite and the sun, and dividing the image into different regions according to offsets of pixel points in the two adjacent frames of images caused by the movement of the explorer satellite and the earth; and determining the regions where the processing objects are located according to the positions $(u_0,v_0)$ of the processing objects, detected in the current frame, in the image coordinate system, so as to obtain pixel offsets $(\Delta u_0, \Delta v_0)$ of the processing objects in the two adjacent frames of images caused by the movement of the explorer satellite and the earth;

(B3) calculating pixel offsets $(\Delta u_1, \Delta v_1) = k^*(u_{nx}, v_{ny})$ of the processing objects in the two adjacent frames of images caused by the movement of the processing objects themselves, where $(u_{nx}, v_{ny})$ is the average image plane speed of the processing objects that is calculated through full-FOV scanning, and k is a time interval between the two adjacent frames; and (B4) compensating for the pixel offsets caused by the movement of the satellite and the earth as well as the movement of the processing objects, and predicting that the positions of the next-frame processing objects in the image coordinate system are $(u_n, v_n) = (u_0 + \Delta u_0 + \Delta u_1, v_0 + \Delta v_0 + \Delta v_1)$.

Preferably, in Step (2-4), for any moving target or dynamic phenomenon, if the infrared spectrum fingerprint of the moving target or dynamic phenomenon does not exist in the typical infrared spectrum library, the infrared spectrum fingerprint of the moving target or dynamic phenomenon is added into the typical infrared spectrum library; and if the infrared spectrum fingerprint of the moving target or dynamic phenomenon exists in the typical infrared spectrum library, the moving target or dynamic phenomenon is identified, and corresponding decision and processing are performed according to the identification result.

The present invention further provides a low-orbit satellite-borne image-spectrum associated detection payload, comprising a two-dimensional servo turntable, an infrared reflector, a multispectral infrared optical system, an infrared imaging unit, a broadband infrared spectrum measuring unit, a data processing unit and a control unit. The infrared reflector is disposed on the two-dimensional servo turntable and used for reflecting infrared light radiated by moving targets and dynamic phenomena into the multispectral infrared optical system. The multispectral infrared optical system is used for dividing the infrared incident light into two exit infrared light beams, one light beam reaches the infrared imaging unit for infrared imaging, and the other light beam reaches the broadband infrared spectrum measuring unit for performing spectrum measurement on the moving targets and the dynamic phenomena and extracting infrared spectrum fingerprints of the moving targets and the dynamic phenomena. The data processing unit is used for performing real-time processing on the infrared image obtained by the infrared imaging unit and the infrared spectrum fingerprints extracted by the broadband infrared spectrum measuring unit, to obtain predicted positions of the moving targets and the dynamic phenomena and the identification results thereof. The control unit is used for controlling rotation of the two-dimensional servo turntable according to the predicted positions of the moving targets and the dynamic phenomena, so that the images of the moving targets and the dynamic phenomena always fall at the center of FOV of the payload, for realizing FOV scanning and target tracking.

In general, compared with the prior art, the above technical solutions of the present invention have the following beneficial effects:

(1) the present invention achieves coaxiality of an infrared imaging optical path and a short/medium/long wave infrared spectrum measuring optical path, so that infrared image information and infrared spectra of moving targets and dynamic phenomena can be detected simultaneously, the volume of equipment is also reduced, which make the equipment be convenient to carry in a satellite and have the characteristic of high performance cost ratio; and (2) multiple moving targets and dynamic phenomena in a scene can be accurately positioned and tracked through pixel offset compensation based on compensation for the movement of the satellite and the earth as well as compensation for the movement of the moving targets and dynamic phenomena, and the characteristics of short response time and high identification efficiency are obtained.

DETAILED DESCRIPTION

In order that the objectives, technical solutions and advantages of the present invention become more comprehensible, the present invention is further described in detail below through the accompanying drawings and the embodiments. It should be understood that, the specific embodiments described herein are merely used to explain the present invention, and are not intended to limit the present invention. Moreover, technical features involved in the implementation manners of the present invention described in the following may be combined with each other as long as no conflict is caused.

Figure 1:
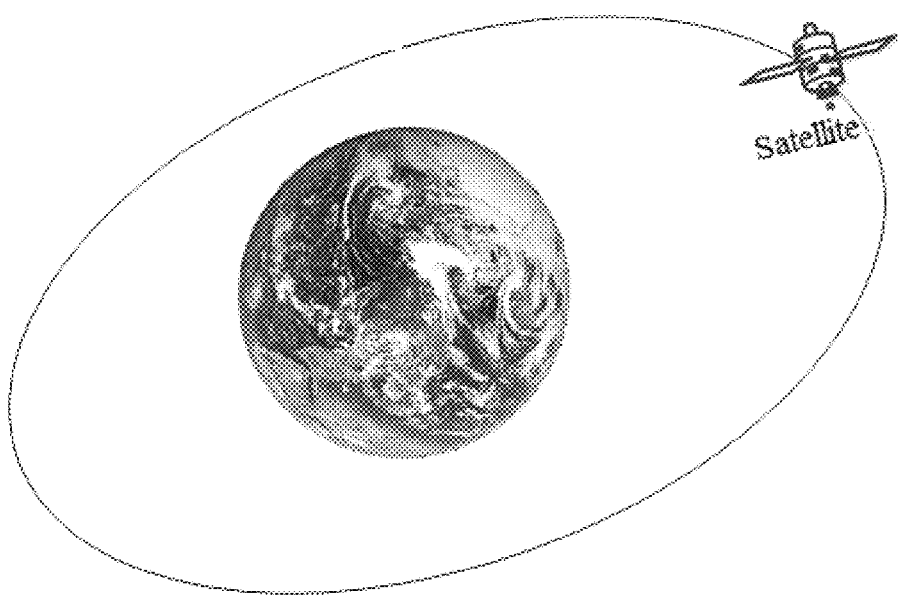
FIG. 1 is a schematic diagram of an operating orbit of a low-orbit satellite.
Figure 2:
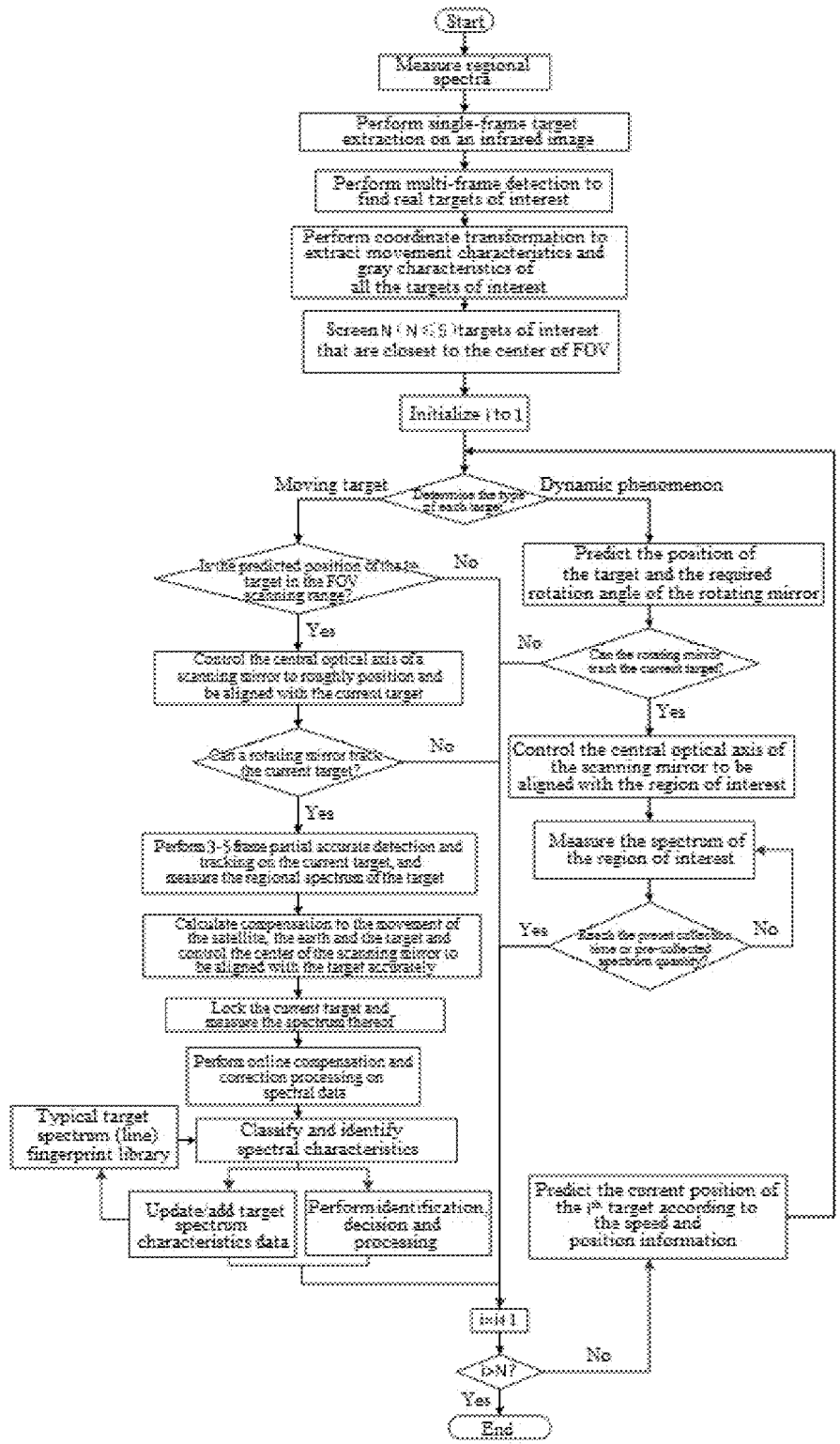
FIG. 2 is a flow chart of a low-orbit satellite-borne image-spectrum associated detection method according to an embodiment of the present invention.

As shown in FIG. 2, a low-orbit satellite-borne image-spectrum associated detection method according to an embodiment of the present invention includes:

(1) detecting and tracking moving targets and dynamic phenomena, Step (1) further including:

(1-1) performing background clutter suppression on an infrared image;

(1-2) performing threshold segmentation on the image after the suppression, and extracting the suspected moving targets and dynamic phenomena;

(1-3) taking the suspected moving targets and dynamic phenomena as processing objects, performing Steps (A1) to (A4) to detect the real moving targets and dynamic phenomena, and tracking to predicted positions of the moving targets or the dynamic phenomena, in which (A1) performing pixel offset compensation of coordinate transformation on processing objects of multiple frames of images, wherein the positions of the processing objects in the same coordinate system at different moments are obtained through coordinate transformation, then the offsets of the processing objects in the infrared image are obtained, and pixel offset compensation is performed;

the following three coordinate systems are involved, namely, an earth core fixed connection coordinate system, a satellite coordinate system and an image coordinate system;

in the earth core fixed connection coordinate system, the earth core serves as the origin O, the X-axis points to the prime meridian, the Z-axis points to the North Pole, and the right-hand corkscrew rule is applied on the X-axis and Z-axis to obtain the Y-axis direction;

in the satellite coordinate system, the direction $l_1$ where the explorer satellite points to the North Pole is the Z'-axis direction, the direction where the explorer satellite points to the sun is $l_2$, the vector direction of a cross-product of $l_1$ and $l_2$ is the Y'-axis direction, and the right-hand corkscrew rule is applied on the Y'-axis and Z'-axis to obtain the X'-axis direction; and in the image coordinate system, an image shot by a satellite camera takes the pixel as a unit, and the coordinates of a single pixel point in the image in the image coordinate system are formed by the row number and the column number of the position of the pixel point;

in Step (A1), pixel offset compensation of coordinate transformation is performed on processing objects of two adjacent frames of images in the following method:

(B1) determining a transformation relationship matrix $M_1$ from the earth core fixed connection coordinate system to the satellite coordinate system according to positions of the explorer satellite and the sun; determining a transformation relationship matrix $M_2$ from the satellite coordinate system to the image coordinate system according to the pinhole imaging principle; and determining a transformation relationship matrix $M_3$ between the satellite coordinate systems at different moments according to positions of the explorer satellite at the different moments;

(B2) because the earth rotates and the moving speed of the low-orbit satellite relative to the earth is high, even if one moving target or dynamic phenomenon moves slowly relative to the earth, pixel offsets may still occur in the imaging plane, so compensation for the movement of the satellite and the earth needs to be performed; a pixel offset division curve is obtained by using the transformation relationship matrixes $M_1$, $M_2$ and $M_3$ according to the positions of the satellite and the sun, and the image is divided into different regions according to offsets of pixel points in the two adjacent frames of images caused by the movement of the explorer satellite and the earth; and the regions where the processing objects are located are determined according to the positions $(u_0, v_0)$ of the processing objects, detected in the current frame, in the image coordinate system, so that pixel offsets $(\Delta u_0, \Delta v_0)$ of the processing objects in the two adjacent frames of images caused by the movement of the explorer satellite and the earth are obtained;

(B3) calculating pixel offsets $(\Delta u_1, \Delta v_1) = k*(u_{nx}, v_{ny})$ of the processing objects in the two adjacent frames of images caused by the movement of the processing objects themselves, where $(u_{nx}, v_{ny})$ is the average image plane speed of the processing objects that is calculated through full-FOV scanning, and k is a time interval between the two adjacent frames; and (B4) pixel offset compensation: compensating for the pixel offsets caused by the movement of the satellite and the earth as well as the movement of the processing objects, and predicting that the positions of the next-frame processing objects in the image coordinate system are $(u_n, v_n) = (u_0 + \Delta u_0 + \Delta u_1, v_0 + \Delta v_0 + \Delta v_1)$;

(A2) performing correlation of the multiple frames of images after pixel offset compensation to detect the real processing objects;

(A3) when the processing objects are moving targets, calculating image plane speed characteristics of the moving targets to obtain predicted positions thereof; and when the processing objects are dynamic phenomena, calculating gray characteristics of the dynamic phenomena to obtain predicted positions thereof; and (A4) positioning positions of next-frame processing objects to the predicted positions of the processing objects, and placing the center of FOV at the predicted positions of the processing objects;

(1-4) because the positioning accuracy at the moment is low, spectrum measurement can be first performed on background regions corresponding to the moving targets or the dynamic phenomena, and specifically, infrared broadband spectra of regions (for example, 5*5 pixel regions) surrounding the center of FOV are measured to obtain regional spectra corresponding to the moving targets or the dynamic phenomena; and (1-5) taking the moving targets or the dynamic phenomena tracked in Step (1-3) as processing objects, and repeating Steps (A1) to (A4) to track the moving targets or the dynamic phenomena accurately;

(2) performing multi-dimensional characteristic analysis on infrared spectra of the moving targets and the dynamic phenomena, to identify the moving targets and the dynamic phenomena, Step (2) further including:

(2-1) accurately positioning the moving targets and the dynamic phenomena and measuring infrared spectra of the moving targets and the dynamic phenomena through 3 to 5 frames of images;

(2-2) performing compensation and correction on the infrared spectra of the moving targets and the dynamic phenomena;

(2-3) removing the regional spectra corresponding to the moving targets and the dynamic phenomena from the infrared spectra of the moving targets and the dynamic phenomena after correction, so as to extract infrared spectrum fingerprints of the moving targets and the dynamic phenomena; and (2-4) matching the infrared spectrum fingerprints of the moving targets and the dynamic phenomena with a typical infrared spectrum library to identify the moving targets and the dynamic phenomena.

Specifically, for any moving target or dynamic phenomenon, if the infrared spectrum fingerprint of the moving target or dynamic phenomenon does not exist in the typical infrared spectrum library, the infrared spectrum fingerprint of the moving target or dynamic phenomenon is added into the typical infrared spectrum library; and if the infrared spectrum fingerprint of the moving target or dynamic phenomenon exists in the typical infrared spectrum library, the moving target or dynamic phenomenon is identified, and corresponding decision and processing are performed according to the identification result.

Figure 3:
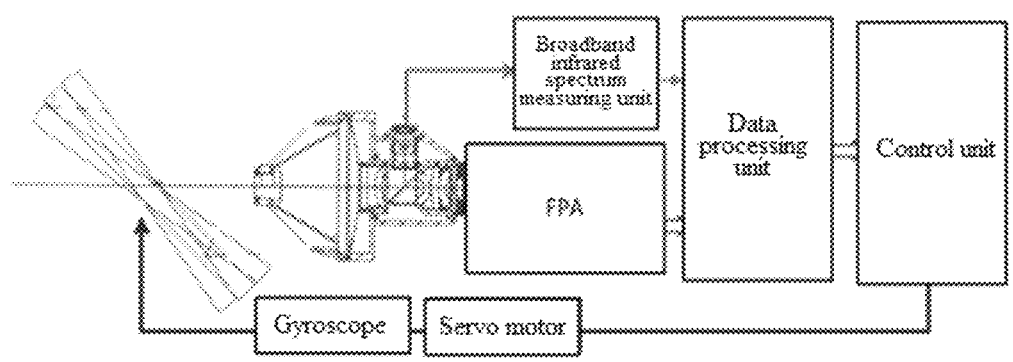
FIG. 3 is a schematic diagram of a low-orbit satellite-borne image-spectrum associated detection payload according to an embodiment of the present invention.

As shown in FIG. 3, a low-orbit satellite-borne image-spectrum associated detection payload that implements the above detection method includes a two-dimensional servo turntable, an infrared reflector, a multispectral infrared optical system, an infrared imaging unit, a broadband infrared spectrum measuring unit, a data processing unit and a control unit.

The infrared reflector is disposed on the two-dimensional servo turntable, the two-dimensional servo turntable is controlled to rotate by a servo motor and gyroscopes (including a multi-directional rotation measuring gyroscope and an optical fiber gyroscope) and drives the infrared reflector to rotate, and the infrared reflector reflects infrared light radiated by moving targets and dynamic phenomena into the multispectral infrared optical system. The multispectral infrared optical system produces two exit infrared light beams, one light beam reaches the infrared imaging unit for infrared imaging, and the other light beam reaches the broadband infrared spectrum measuring unit for performing spectrum measurement on the moving targets and the dynamic phenomena.

Figure 4:
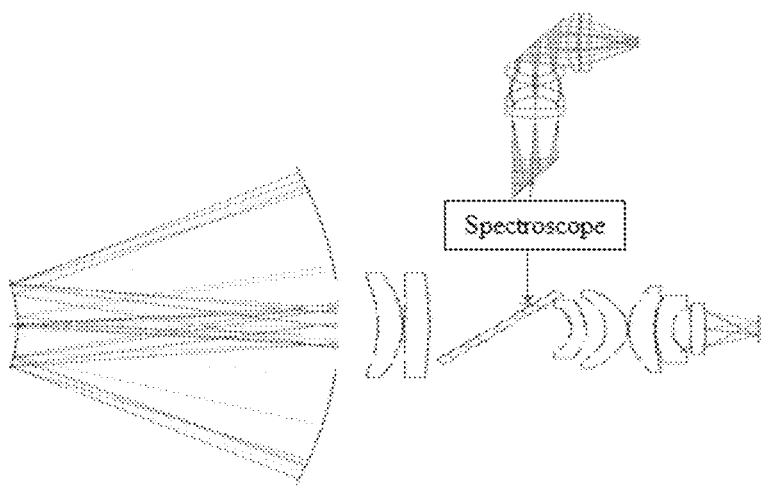
FIG. 4 is a layout chart of a multispectral infrared optical system.
Figure 5:
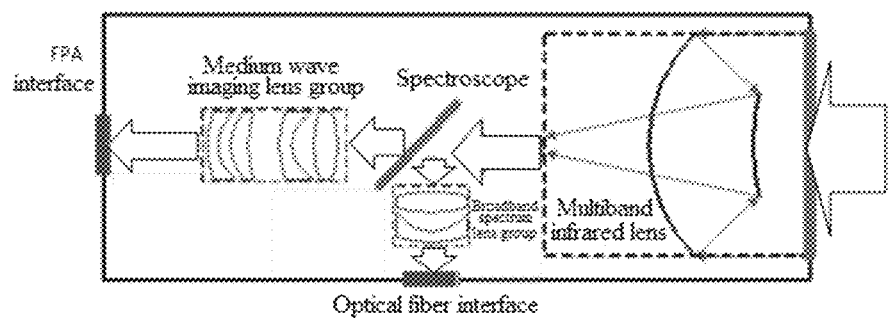
FIG. 5 is a schematic diagram of a Cassegrain system adopted by the multispectral infrared optical system.

The layout of the multispectral infrared optical system is shown in FIG. 4, and the multispectral infrared optical system adopts a Cassegrain system shown in FIG. 5. The Cassegrain system is consist of a parabolic primary mirror and a hyperboloidal secondary mirror, and employs several lens groups to correct aberration. The system achieves coaxiality of an infrared imaging optical path and a short/medium/long wave infrared spectrum measuring optical path, the focus of the paraboloid coincides with the virtual focus of the hyperboloid, and an ideal image is formed at another focus through the hyperboloid. To reduce the influence of the radiation of the lens itself on detection, athermalisation is adopted. A spectroscope is coated with a double-layer antireflection film, and thus has high reflectivity for short/medium wave infrared light and has a semi-transmitting and semi-reflecting function for long wave infrared light.

The infrared imaging unit is a focal plane array (FPA) on which a photosensitive element array is arranged, and is capable of imaging on these photosensitive elements in a focal plane through the multispectral infrared optical system by using infrared rays emitted by a light-emitting source, converting received optical signals into electrical signals, integrally amplifying, sampling and holding the electrical signals and finally forming an image through an output buffer and multipath transmission system.

The broadband infrared spectrum measuring unit is used for performing spectrum measurement on the moving targets and the dynamic phenomena and extracting infrared spectrum fingerprints of the moving targets and the dynamic phenomena.

The data processing unit can perform real-time processing on the infrared image formed by the FPA and the infrared spectrum fingerprints extracted by the broadband infrared spectrum measuring unit. Specifically, the data processing unit detects the moving targets and the dynamic phenomena according to the infrared image, performs pixel offset compensation on positions of the moving targets and the dynamic phenomena, acquires, through multi-frame correlation, coordinates and image plane speed information of the moving targets or coordinates and gray information of the dynamic phenomena, further acquires predicted positions of the moving targets and the dynamic phenomena and sends the predicted positions to the control unit. Further, the data processing unit matches the extracted infrared spectrum fingerprints of the moving targets and the dynamic phenomena with a typical infrared spectrum library, identifies the moving targets and the dynamic phenomena according to the spectrum matching result and the infrared image, and transfers the identification result to the control unit.

The control unit receives data transmitted by the data processing unit, obtains the predicted positions of the moving targets and the dynamic phenomena, and controls the two-dimensional servo motor as well as the multi-directional rotation measuring gyroscope and the optical fiber gyroscope, so that the two-dimensional servo turntable is enabled to rotate and drives the infrared reflector to move in two dimensions like deflection and inclination, so that the images of the moving targets and the dynamic phenomena always fall at the center of FOV of the low-orbit satellite-borne image-spectrum associated detection payload, for realizing FOV scanning and target tracking.

To make persons skilled in the art better understand the present invention, the process of adopting the detection payload of the present invention to implement the low-orbit satellite-borne image-spectrum associated detection method is illustrated in detail below with reference to specific embodiments.

Figure 6:
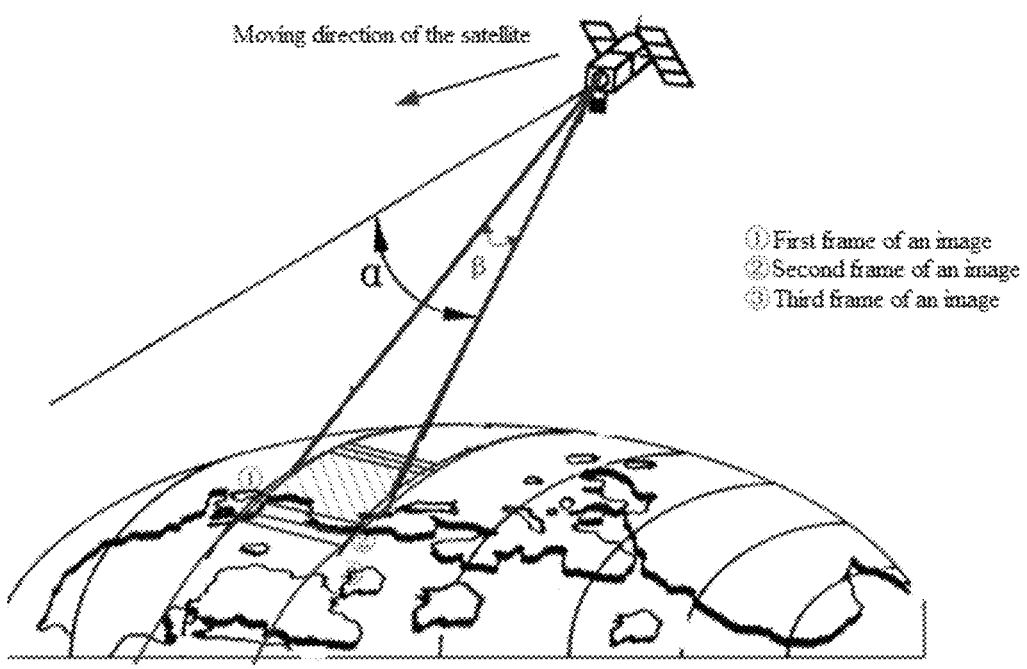
FIG. 6 is a schematic working diagram of the low-orbit satellite-borne image-spectrum associated detection payload.

As shown in FIG. 6, three consecutive frames are detected and suspected targets are extracted in fixed FOV according to the moving trajectory of the satellite. To reduce the swinging times of the image-spectrum associated detection payload, the FOV is fixed, and three consecutive frames of images are detected according to the moving trajectory of the satellite; background clutter suppression is performed on each frame of an image obtained, threshold segmentation is then performed and the suspected moving targets and dynamic phenomena are extracted; the gray value of a pixel point greater than the threshold is set as the maximum value, and the gray value of a pixel point lower than the threshold is set as 0, and the suspected moving targets and dynamic phenomena are extracted.

The real moving targets and dynamic phenomena are determined in all the suspected moving targets and dynamic phenomena through pixel offset compensation and multi-frame correlation, and are marked according to a connected domain rule, the position of the center of mass of each moving target or dynamic phenomenon is then calculated, and the position and image plane speed information or gray information of each real moving target or dynamic phenomenon are primarily determined through coordinate correlation, thereby reducing the false alarm.

The average image plane speed and gray change of all the moving targets and the dynamic phenomena are calculated, and the types of the moving targets and the dynamic phenomena are determined. If the position of a moving target or dynamic phenomenon does not change and the gray characteristic thereof is time-varying, the processing object is determined as a dynamic phenomenon; otherwise, the processing object is determined as a moving target; and if the processing object is determined as a dynamic phenomenon, a focus mode is implemented, that is, the central optical axis of a scanning mirror is controlled to be aligned with the position of the processing object for long-term spectrum measurement.

Figure 7:
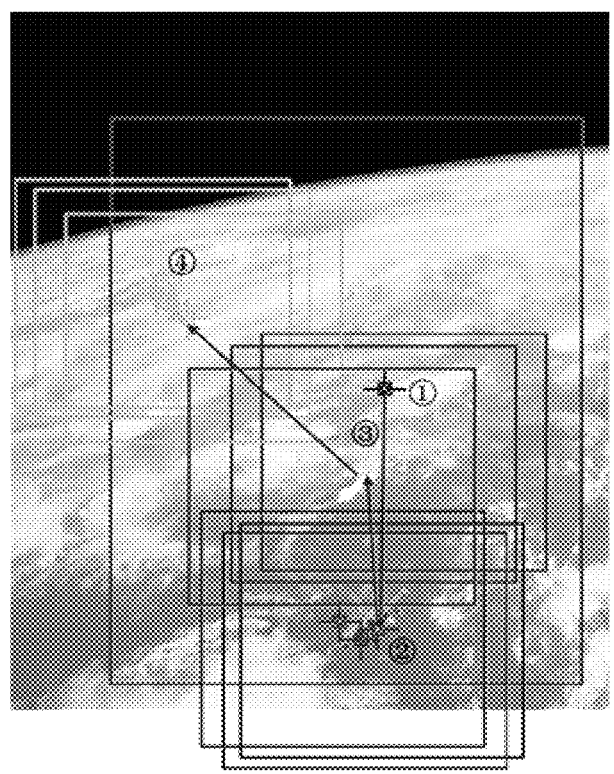
FIG. 7 is an instance diagram of the low-orbit satellite-borne image-spectrum associated detection payload performing multi-target capturing, tracking and spectrum measurement.

Because the low-orbit satellite has a high moving speed, to prevent the two-dimensional servo turntable from rotating by an excessively large angle, five moving targets or dynamic phenomena closest to the center of FOV are selected from the found real moving targets and dynamic phenomena to perform tracking and spectrum measurement according to the actual condition; and if the quantity of the found real moving targets and dynamic phenomena is smaller than five, tracking and spectrum measurement are performed on all the moving targets or dynamic phenomena, and the measurement of infrared spectra and data processing and target identification are performed on the selected moving targets and dynamic phenomena from bottom to top and from left to right. As shown in FIG. 7, tracking and spectrum measurement are performed on the moving targets and the dynamic phenomena from bottom to top and from left to right, and the sequence is that the initial FOV ① first moves to the bottom target ② for tracking and spectrum measurement, then moves to a little bit upper target ③ for tracking and spectrum measurement, and finally moves to the top target ④ for tracking and spectrum measurement.

The following steps are included:

detecting the infrared image to obtain coordinates and movement characteristics of the moving targets and the dynamic phenomena, and predicting and positioning the compensation for the movement of the satellite and the earth as well as the compensation for the movement of the moving targets and the dynamic phenomena for the positions of the moving targets and the dynamic phenomena;

determining, according to the position and image plane speed information of the current moving target or dynamic phenomenon, whether a rotating mirror can track the moving target or dynamic phenomenon, and if so, performing the following step; otherwise, performing tracking and spectrum measurement on a next moving target or dynamic phenomenon according to priorities;

controlling the two-dimensional servo turntable to drive the infrared reflector to point to a predicted coordinate position of the moving target or dynamic phenomenon;

accurately detecting and tracking 3 to 5 frames in the region near the current center of FOV while measuring the background spectrum of the moving target or dynamic phenomenon, calculating pixel offset compensation, and controlling the center of the multispectral infrared optical system to be accurately aligned with the moving target or dynamic phenomenon;

locking the current moving target or dynamic phenomenon, and performing spectrum measurement on the moving target or dynamic phenomenon;

performing online compensation and correction processing on measured spectral line data, and if the spectral data does not exist in a spectrum fingerprint library, adding the infrared spectrum characteristic data of the moving target or dynamic phenomenon; otherwise, matching the spectrum and identifying and determining the moving target or dynamic phenomenon;

repeating the above steps on the next moving target or dynamic phenomenon, till infrared spectrum collection and matching are performed on all the selected moving targets and dynamic phenomena; and rotating the two-dimensional servo turntable, returning to the initial direction, and repeating all the above operations.

In the low-orbit satellite-borne image-spectrum associated detection payload, the resolution of the infrared imaging unit is (a*a), the frame frequency is $f_1$, the focal length of the multispectral infrared optical system is $f_2$, the pixel size of the image is (b,b), the image size is (n,m), the maximum operating speed of the explorer satellite is the $V_{s\ max}$ the moving speed of the moving target or dynamic phenomenon is $V_{t\ max}$ the size of the spectrum measuring region surrounding the center of FOV is (N,M), and the integration time required for measuring the infrared spectrum is $t_1$.

It is required that the moving target and the dynamic phenomenon cannot move outside the spectrum measuring region during spectrum measurement, then a satisfies the following constraint condition:

$$a \geq \frac{(V_{smax} + V_{tmax})*t_1}{\frac{1}{2}*\min(N, M)} = \frac{2*(V_{smax} + V_{tmax})*t_1}{\min(N, M)}.$$

Multi-frame detection is performed on the moving target and dynamic phenomenon, then the displacement of the moving target and dynamic phenomenon in the multiple frames of images is required to be larger than one pixel and smaller than the diagonal length of the image, so that the target may not get lost immediately in one frame of an image and can be surely detected, and the constraint equations are as follows:

$$1 < \frac{(V_{smax} + V_{tmax})}{f_1 * a} < \sqrt{n^2 + m^2},$$

$$\frac{(V_{smax} + V_{tmax})}{a*\sqrt{n^2 + m^2}} < f_1 < \frac{(V_{smax} + V_{tmax})}{a}.$$

If the payload needs to measure the infrared spectra of the moving targets and the dynamic phenomena, the maximum swinging angle is required to be the swinging angle after four frames, so the accuracy $\Delta\theta$ of the rotation angle of the two-dimensional servo turntable satisfies the following condition:

$$\arctan\left(\frac{(V_{smax} + V_{tmax})*4}{f_1 * a * f_2}\right) \leq \Delta\theta.$$

When the payload is placed in a low-orbit satellite (for example, the MSX), the maximum operating speed of the satellite is 7.6 km/s, the speed of an existing supersonic airplane is within 1 km/s, a 1024*1024 image is adopted, the size of the spectrum measuring region is 5*5, the integration time for spectrum measurement is 0.1 s, the required resolution is 400 m*400 m, and the frame rate of image generation is 50 fps. Therefore, the payload has high performance cost ratio and high capture rate.

A person skilled in the art can easily understand that the above descriptions are merely preferred embodiments of the present invention, and are not intended to limit the present invention. Any modification, equivalent replacement and improvement made without departing from the spirit and principle of the present invention shall all fall within the protection scope of the present invention.

The invention claimed is:

1. A low-orbit satellite-borne image-spectrum associated detection method, comprising:
   (1) detecting and tracking moving targets and dynamic phenomena using a low-orbit satellite, comprising:
      (1-1) performing background clutter suppression on an infrared image;
      (1-2) performing threshold segmentation on the image after the suppression, and extracting the suspected moving targets and dynamic phenomena;

(1-3) taking the suspected moving targets and dynamic phenomena as processing objects, detecting the real moving targets and dynamic phenomena, and placing the center of field of view (FOV) at predicted positions of the moving targets or the dynamic phenomena so as to track the moving targets or the dynamic phenomena, the detecting including:
  (A1) performing pixel offset compensation of coordinate transformation on processing objects of multiple frames of images;
  (A2) performing correlation of the multiple frames of images after pixel offset compensation to detect the real processing objects;
  (A3) when the processing objects are moving targets, calculating image plane speed characteristics of the moving targets to obtain predicted positions thereof; and when the processing objects are dynamic phenomena, calculating gray characteristics of the dynamic phenomena to obtain predicted positions thereof; and
  (A4) positioning positions of next-frame processing objects to the predicted positions of the processing objects, and placing the center of FOV at the predicted positions of the processing objects;
(1-4) measuring infrared broadband spectra of regions surrounding the center of FOV to obtain regional spectra corresponding to the moving targets or the dynamic phenomena; and
(1-5) taking the moving targets or the dynamic phenomena tracked in Step (1-3) as processing objects, and repeating Steps (A1) to (A4) to track the moving targets or the dynamic phenomena,
(2) performing multi-dimensional characteristic analysis on infrared spectra of the moving targets and the dynamic phenomena to identify the moving targets and the dynamic phenomena, comprising:
  (2-1) positioning the moving targets and the dynamic phenomena and measuring infrared spectra of the moving targets and the dynamic phenomena;
  (2-2) performing compensation and correction on the infrared spectra of the moving targets and the dynamic phenomena;
  (2-3) removing the regional spectra corresponding to the moving targets and the dynamic phenomena from the infrared spectra of the moving targets and the dynamic phenomena after correction, so as to extract infrared spectrum fingerprints of the moving targets and the dynamic phenomena; and
  (2-4) matching the infrared spectrum fingerprints of the moving targets and the dynamic phenomena with a typical infrared spectrum library to identify the moving targets and the dynamic phenomena; and
(3) controlling a two-dimensional servo motor and multi-directional rotation measuring gyroscope and optical fiber gyroscope of the low-orbit satellite to maintain the moving targets and dynamic phenomena within a center of the FOV of the low-orbit satellite.

2. The low-orbit satellite-borne image-spectrum associated detection method according to claim 1, wherein in Step (A1), pixel offset compensation of coordinate transformation is performed on processing objects of two adjacent frames of images in the following method:
  (B1) determining a transformation relationship matrix $M_1$ from an earth core fixed connection coordinate system to a satellite coordinate system according to positions of an explorer satellite and the sun; determining a transformation relationship matrix $M_2$ from the satellite coordinate system to an image coordinate system according to the pinhole imaging principle; and determining a transformation relationship matrix $M_3$ between satellite coordinate systems at different moments according to positions of the explorer satellite at the different moments,
  wherein in the earth core fixed connection coordinate system, the earth core serves as the origin O, the X-axis points to the prime meridian, the Z-axis points to the North Pole, and the right-hand corkscrew rule is applied on the X-axis and Z-axis to obtain the Y-axis direction; in the satellite coordinate system, the direction $l_1$ where the explorer satellite points to the North Pole is the Z'-axis direction, the direction where the explorer satellite points to the sun is $l_2$, the vector direction of a cross-product of $l_1$ and $l_2$ is the Y'-axis direction, and the right-hand corkscrew rule is applied on the Y'-axis and Z'-axis to obtain the X'-axis direction; and the coordinates of a single pixel point in an image in the image coordinate system are formed by the row number and the column number of the position of the pixel point;
  (B2) obtaining a pixel offset division curve by using the transformation relationship matrixes $M_1$, $M_2$ and $M_3$ according to the positions of the satellite and the sun, and dividing the image into different regions according to offsets of pixel points in the two adjacent frames of images caused by the movement of the explorer satellite and the earth; and determining the regions where the processing objects are located according to the positions $(u_0, v_0)$ of the processing objects, detected in the current frame, in the image coordinate system, so as to obtain pixel offsets $(\Delta u_0, \Delta v_0)$ of the processing objects in the two adjacent frames of images caused by the movement of the explorer satellite and the earth;
  (B3) calculating pixel offsets $(\Delta u_1, \Delta v_1)=k*(u_{nx}, v_{ny})$ of the processing objects in the two adjacent frames of images caused by the movement of the processing objects themselves, where $(u_{nx}, v_{ny})$ is the average image plane speed of the processing objects that is calculated through full-FOV scanning, and k is a time interval between the two adjacent frames; and
  (B4) compensating for the pixel offsets caused by the movement of the satellite and the earth as well as the movement of the processing objects, and predicting that the positions of the next-frame processing objects in the image coordinate system are $(u_n, v_n)=(u_0+\Delta u_0+\Delta u_1, v_0+\Delta v_0+\Delta v_1)$.

3. The low-orbit satellite-borne image-spectrum associated detection method according to claim 1, wherein in Step (2-4), for any moving target or dynamic phenomenon, if the infrared spectrum fingerprint of the moving target or dynamic phenomenon does not exist in the typical infrared spectrum library, the infrared spectrum fingerprint of the moving target or dynamic phenomenon is added into the typical infrared spectrum library; and if the infrared spectrum fingerprint of the moving target or dynamic phenomenon exists in the typical infrared spectrum library, the moving target or dynamic phenomenon is identified, and corresponding decision and processing are performed according to the identification result.

* * * * *